United States Patent Office 3,322,840
Patented May 30, 1967

3,322,840
METHOD OF PREPARING TERTIARY ALKYL
CHLORIDES AND OLEFINS
Eldon E. Frisch, Midland, Mich., assignor to Dow Corning Corporation, Midland, Mich., a corporation of Michigan
No Drawing. Filed Sept. 28, 1962, Ser. No. 227,033
13 Claims. (Cl. 260—653.5)

This invention relates to a novel method of preparing tertiary organic chlorides containing a branched halocarbon structure. This invention further relates to a novel method of producing olefins with a branched halocarbon structure. In a specific embodiment of this invention there can be prepared highly fluorinated olefins.

Olefins in general find use as intermediates for the preparation of organic high polymers. The use of olefins containing chlorine therein to prepare polymers is illustrated by such well-known polymers as chloroprene and polyvinyl chloride. The presence of chlorine in such polymers imparts one or more of such desirable properties as fuel and oil resistance, flame resistance, easier curing ability, etc. The use of olefins containing fluorine therein to prepare high polymers is illustrated by such polymers as polyvinylidene fluoride. The presence of fluorine introduces one or more of such desirable properties as fuel and oil resistance, more chemical inertness, greater physiological inertness, and improved thermal stability.

It is an object of this invention to provide a novel preparation of tertiary organic chlorides. It is a further object of this invention to provide a novel method for preparing olefins containing fluorine, chlorine or a combination thereof. Another object of this invention is to provide a more economical method for preparing certain olefins. Still another object is to provide a method of preparing olefins with specific perhaloalkyl radicals therein.

This invention relates to a method comprising reacting (1) a compound of the formula $$C_nX_{2n+1}(C_{n-1}X_{2n-1}CXCl)\overset{OH}{\underset{|}{C}}CHR_2$$

wherein R is selected from the group consisting of hydrogen atoms, alkyl radicals, cycloalkyl radicals, and perfluoroalkylmethyl radicals, X is selected from the group consisting of fluorine and chlorine, and $n$ has a value from 1 to 10 inclusive, with (2) sulfur tetrafluoride, whereby there is formed (3) a compound of the formula $$C_nX_{2n+1}(C_{n-1}X_{2n-1}CXF)\overset{Cl}{\underset{|}{C}}CHR_2$$

wherein X, R and $n$ are as above defined.

In the compounds above X can be chlorine or fluorine, $n$ has a value of 1 to 10 inclusive, and each $n$ can be the same or different. Therefore examples of perhaloalkyl radicals that can be included in the above compounds include —CF$_3$, —CFCl$_2$, —C$_2$F$_2$Cl$_3$, —C$_{10}$F$_7$Cl$_{14}$, —C$_7$F$_{12}$Cl$_3$, etc., in both straight and branched chain configuration.

Radical R can be, in addition to a hydrogen atom, any radical as stated above. Thus R can also be an alkyl radical such as methyl, ethyl, isopropyl, tertiarybutyl and octadecyl; a cycloalkyl radical of from 4 to 6 carbon atoms such as cyclobutyl or cyclohexyl; or a perfluoroalkylmethyl radicals such as CF$_3$CH$_2$—, C$_2$F$_5$CH$_2$—, and C$_{10}$F$_{21}$CH$_2$—, both straight and branched chain. Each R radical can be the same or different. Thus, the —CHR$_2$ group can be, for example, —CH$_3$, —CH$_2$CH$_3$,

—CH(C$_2$H$_5$)C$_{18}$H$_{37}$,

—CH$_2$CH$_2$CF$_3$, —CH(CH$_3$)(CH$_2$C$_2$F$_5$),

—CH(CH$_2$C$_{10}$F$_{21}$)(CH$_2$C$_3$F$_7$)

and

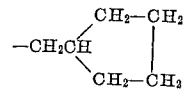

Thus, examples of alcohols suitable for the process of this invention include such as

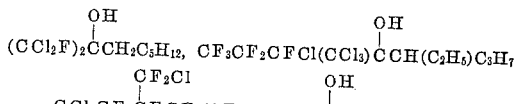

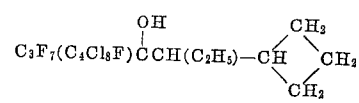

and

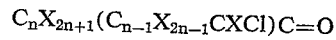

The tertiary alcohols employed in the method of this invention can be prepared most easily by the well-known reaction of a Grignard reagent of the formula R$_2$CHMgY wherein R is as defined above and Y is chlorine, bromine or iodine with perhaloketones of the formula $$C_nX_{2n+1}(C_{n-1}X_{2n-1}CXCl)C=O$$

wherein X and $n$ are as above defined. Upon hydrolysis of the addition product, the desired alcohol is formed. Many of the said alcohols are new compounds.

It is taught in the art that the reaction of an alcohol with sulfur tetrafluoride produces the corresponding organic fluoride wherein the hydroxyl group of the alcohol has been replaced by a fluorine atom. However, it was unexpectedly found that an alcohol of the instant configuration does not so react. Instead there is obtained the chloride by the reaction of sulfur tetrafluoride thereon. Apparently, the sulfur tetrafluoride causes migration of a chlorine atom from an adjacent CX$_2$Cl group, which chlorine atom displaces the hydroxyl group. The entering fluorine atom, from the sulfur tetrafluoride, then replaces the migrating chlorine atom. It is not certain, however, that the above is the mechanism, and the explanation is not intended to limit the invention to the above mechanism. The net result is that there is obtained a tertiary chloride from a tertiary alcohol. At the same time, the fluorine content of the said alcohol has been increased by one fluorine atom.

The reaction between the instant tertiary alcohols and sulfur tetrafluoride proceeds without a catalyst. The reaction is carried out in a pressure vessel at autogeneous pressure. While the reaction proceeds at ordinary temperatures, it is preferable to heat the reacting mixture to temperatures of 50° C. to 150° C. for a more favorable rate of reaction. However, room temperature is sufficient, and the reaction can be carried out at this temperature or any desired temperature above this up to 250° C. and beyond, limited only by the decomposition temperature of the particular alcohol employed.

The products are useful as solvents and carriers as, for example, in chemical reactions. In addition, the said products are useful for the preparation of olefins. They are easily dehydrochlorinated by the action of such as alkali hydroxides, for example, sodium hydroxide and other well known dehydrochlorinating agents to the corresponding olefins, the hydrogen of the hydrochloric acid removed thereby being derived from the —CHR$_2$ group of the tertiary chloride.

By employing fluorination agents that replace chlorine with fluorine, any of the tertiary chlorides prepared by the method of this invention can be converted to hydrofluorocarbon olefins. Of particular interest is the feasibility of utilizing the process of this invention to prepare the compound 1,1-bis(trifluoromethyl)ethylene. In this particular instance, any perhaloacetone of the formula $$CX_3(CX_2Cl)C=O$$

(wherein X is as defined earlier) can be employed, or there can be employed mixtures of two or more of the said perhaloacetones. The said acetone or mixtures of two or more thereof is reacted with methyl Grignard reagent, which upon hydrolysis yields an alcohol (or mixture thereof) of the formula $$CX_3(CX_2Cl)\overset{OH}{\underset{|}{C}}CH_3$$

The reaction of the said alcohol with sulfur tetrafluoride gives the chloride of the formula $$CX_2F(CX_3)\overset{Cl}{\underset{|}{C}}CH_3$$

This particular compound can be easily simultaneously fluorinated and dehydrochlorinated to 1,1-bis(trifluoromethyl)ethylene by the usual fluorination agents which replace chlorine with fluorine, for example, such as described in U.S. Patent 2,744,148. Because the final step is perfluorination of the perhalomethyl radicals, the original acetone can, therefore, be a mixture of two or more acetones, as mentioned earlier. This makes the process even more economical in that pure starting compounds need not be used.

The simultaneous fluorination and dehydrochlorination referred to above occurs under the usual fluorination conditions for fluorination agents of the said class. The exact mechanism for the dehydrochlorination is not known, but it is believed by many in the field to be thermally induced. Thus, when the chloride in the previous paragraph is $$(CF_3)_2\overset{Cl}{\underset{|}{C}}CH_3$$

merely heating the said compound to a sufficient temperature will cause dehydrochlorination to the olefin of the formule $(CF_3)_2C=CH_2$. Of course, other methods such as the use of alkali hydroxides, quinoline, etc., can be employed to effect the said dehydrochlorination.

The 1,1-bis(trifluoromethyl)ethylene finds use as a monomer in olefin polymerizations, and in the preparation of fluorine-containing organosilicone compounds, for example, as shown in U.S. Patent 3,015,585.

The following examples are illustrative only and should not be construed as limiting the invention which is properly delineated in the appended claims.

*Example 1*

This example illustrates the preparation of the tertiary alcohols employed in the method of this invention.

A 5-liter, 3-necked flask was charged with $$CCl_2F(CClF_2)C=O$$

(1,078 g., 5 mols) and an equal volume of diethylether. The flask was fitted with a water cooled condenser, Hirschberg stirrer and addition funnel. The flask and contents were cooled to approximately −2° C. A solution of methyl magnesium bromide (3 mols, 357 g.) in 1000 g. of diethylether was added to the vigorously stirred acetone solution and the temperature maintained below 5° C. by regulating its rate of addition. After the equimolar quantity of Grignard reagent was added, the mixture was allowed to warm slowly to room temperature, and the stirring continued for an additional 16 hours. The mixture was then hydrolyzed over crushed ice, there being present in addition, sufficient hydrochloric acid to dissolve the magnesium salts. The ether layer was separated, washed with water, and distilled to a temperature of 70° C. Benzene was added and water removed by the azeotropic method. Distillation was then continued in a fractionation column. There was obtained the product $$CCl_2F(CClF_2)\overset{OH}{\underset{|}{C}}CH_3$$

boiling point 70° C. at 40 mm., in 80 percent yield. The structure of the compound was confirmed by rigorous analytical methods.

*Example 2*

Following the procedure of Example 1, the following alcohols were prepared from the following perhaloacetones.

TABLE I

| Acetone | Alcohol |
|---|---|
| $(CCl_3)_2C=O$ | $(CCl_3)_2\overset{OH}{\underset{|}{C}}CH_3$ |
| $(CClF_2)_2C=O$ | $(CClF_2)_2\overset{OH}{\underset{|}{C}}CH_3$ |

*Example 3*

When any of the following Grignard reagents are reacted with $(CCl_2F)_2C=O$ as per the method of Example 1, there are obtained alcohols as shown:

TABLE II

| Grignard Reagent | Alcohol |
|---|---|
| $C_7H_{15}MgCl$ | $(CCl_2F)_2\overset{OH}{\underset{|}{C}}C_7H_{15}$ |
| $C_3H_7(C_4H_9)CHMgBr$ | $(CCl_2F)_2\overset{OH}{\underset{|}{C}}CH(C_3H_7)C_4H_9$ |
| $C_3F_7CH_2CH_2MgI$ | $(CCl_2F)_2\overset{OH}{\underset{|}{C}}CH_2CH_2C_3F_7$ |
| $C_2H_5(CF_3H_2)CHMgBr$ | $(CCl_2F)_2\overset{OH}{\underset{|}{C}}CH(CH_2CF_3)C_2H_5$ |
| $C_3F_7CH_2(C_{10}F_{21}CH_2)CHMgBr$ | $(CCl_2F)_2\overset{OH}{\underset{|}{C}}CH(CH_2C_{10}F_{21})CH_2C_3F_7$ |
| $\begin{array}{c}CH_2-CH_2\\ \phantom{CH_2-}\diagdown\\ \phantom{CH_2-CH_2}CHCH_2MgBr\\ \phantom{CH_2-}\diagup\\ CH_2-CH_2\end{array}$ | $(CCl_2F)_2\overset{OH}{\underset{|}{C}}CH_2CH\begin{array}{c}CH_2-CH_2\\ \diagup\\ \\ \diagdown\\ CH_2-CH_2\end{array}$ |

Example 4

When any of the following perhaloketones are reacted with methyl Grignard reagents as per the method of Example 1, there are obtained tertiary alcohols as shown:

TABLE III

| Ketone | Alcohol |
|---|---|
| $\begin{array}{c}CF_3CFCl\\ \phantom{CF_3CFCl}\diagdown\\ \phantom{CF_3CF}C{=}O\\ \phantom{CF_3CF}\diagup\\ CFCl_2CF_2\end{array}$ | $\begin{array}{c}CF_3CFCl\phantom{XX}OH\\ \phantom{CF_3CFCl}\diagdown\phantom{X}\|\\ \phantom{CF_3CF}C{-}CH_3\\ \phantom{CF_3CF}\diagup\\ CFCl_2CF\end{array}$ |
| $\begin{array}{c}C_7F_{11}Cl_4\\ \phantom{C_7F_{11}}\diagdown\\ \phantom{C_7F_{11}}C{=}O\\ \phantom{C_7F_{11}}\diagup\\ C_9F_6Cl_{13}\end{array}$ | $\begin{array}{c}C_7F_{11}Cl_4\phantom{XX}OH\\ \phantom{C_7F_{11}Cl_4}\diagdown\phantom{X}\|\\ \phantom{C_7F_{11}Cl_4}C{-}CH_3\\ \phantom{C_7F_{11}Cl_4}\diagup\\ C_9F_6Cl_{13}\end{array}$ |
| $\begin{array}{c}CCl_3\\ \phantom{CC}\diagdown\\ \phantom{CC}C{=}O\\ \phantom{CC}\diagup\\ C_3F_7\end{array}$ | $\begin{array}{c}CCl_3\phantom{XX}OH\\ \phantom{CCl_3}\diagdown\phantom{X}\|\\ \phantom{CCl_3}C{-}CH_3\\ \phantom{CCl_3}\diagup\\ C_3F_7\end{array}$ |

Example 5

A stainless steel bomb was charged with

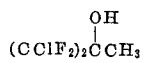

(435 g., 2 mols) and sulfur tetrafluoride (230 g., 2.13 mols). The bomb was sealed and heated to 90° C. for about 16 hours with rocking and rotation, then cooled to room temperature and excess sulfur tetrafluoride vented to a suitable trap. The products were removed, washed with water and distilled. There was obtained the product

(281 g., 1.3 mols, 65 percent yield), boiling point 74° C. The structure of this compound was confirmed by rigorous analytical techniques.

In like manner, the alcohol

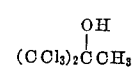

produced the chloride of the formula

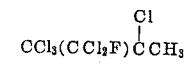

and the alcohol

the chloride $$CCl_2F(CF_3)\overset{Cl}{\underset{|}{C}}CH_3$$

Example 6

When the following alcohols are reacted with sulfur tetrafluoride as per the procedure of Example 4, the following tertiary chlorides are obtained.

TABLE IV

| Alcohol | Chloride |
|---|---|
| $(CCl_2F)_2\overset{OH}{\underset{|}{C}}CH_2C_3H_7$ | $CClF_2(CCl_2F)\overset{Cl}{\underset{|}{C}}CH_2C_3H_7$ |
| $CF_3CF_2(CCl_3)\overset{OH}{\underset{|}{C}}CH(C_3H_7)C_7H_{15}$ | $CF_3CF_2(CCl_2F)\overset{Cl}{\underset{|}{C}}CH(C_3H_7)C_7H_{15}$ |
| $C_4F_3Cl_6(CCl_2F)\overset{OH}{\underset{|}{C}}CH_2CH_2C_2F_5$ | $C_4F_3Cl_6(CF_3)\overset{Cl}{\underset{|}{C}}CH_2CH_2C_2F_5$ |
| $CCl_3(CCl_2F)\overset{OH}{\underset{|}{C}}CH(CH_3)CH_2C_2F_5$ | $(CCl_2F)_2\overset{Cl}{\underset{|}{C}}CH(CH_3)CH_2C_2F_5$ |
| $CClF_2(C_{10}F_{21})\overset{OH}{\underset{|}{C}}CH(CH_2C_2F_5)CH_2C_4F_9$ | $C_{10}F_{21}(CF_3)\overset{Cl}{\underset{|}{C}}CH(CH_2C_2F_5)CH_2C_4F_9$ |
| $(CF_2ClCFClCCl_2)_2\overset{OH}{\underset{|}{C}}CH_2C\overset{\diagup CH_2-CH_2\diagdown}{\underset{\diagdown CH_2-CH_2\diagup}{H}}CH_2$ | $\begin{array}{c}CF_2ClCFClCCl_2\phantom{X}Cl\\ \phantom{CF_2ClCFCl}\diagdown\phantom{X}\|\phantom{X}\diagup CH_2-CH_2\diagdown\\ \phantom{CF_2ClCFClC}CCH_2CH\phantom{XXXXX}CH_2\\ \phantom{CF_2ClCFCl}\diagup\phantom{XXXXXX}\diagdown CH_2-CH_2\diagup\\ CF_2ClCFClCFCl\end{array}$ |
| $CCl_3(CF_3)\overset{OH}{\underset{|}{C}}CH(C_2H_5)CH_2C_3F_7$ | $CCl_2F(CF_3)\overset{Cl}{\underset{|}{C}}CH(C_2H_5)CH_2C_3F_7$ |

Example 7

A mixture of 280 g. of

and excess anhydrous hydrogen fluoride were passed through a tube heated to a skin temperature of 460° C. and containing therein a fluorination catalyst of the type described in U.S. Patent 2,744,148. The effluent was collected in a Dry Ice cooled trap. Distillation of the effluent yielded $(CF_3)_2C{=}CH_2$, boiling point 14° C., and

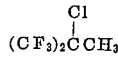

boiling point 38° C. The latter compound was easily dehydrochlorinated with alcoholic sodium hydroxide to yield the olefin shown above. The total yield was 65 percent.

In like manner, the following tertiary chloride produced $(CF_3)_2C{=}CH_2$ when fluorinated as per the above:

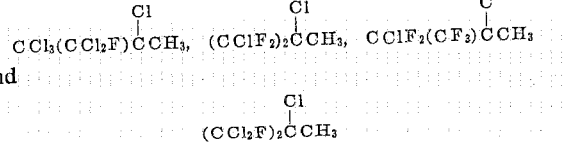

and $$(CCl_2F)_2\overset{Cl}{\underset{|}{C}}CH_3$$

Example 8

When any of the following chlorides are dehydrochlorinated, using one or more of an alkali hydroxide or quinoline, or other dehydrochlorinating agent, the following olefins are formed:

TABLE V

| Chloride | Olefin |
|---|---|
| CF$_2$Cl, Cl, CH$_3$ / CCH / CFCl$_2$, CH$_2$CF$_3$ | CF$_2$Cl, CH$_3$ / C=C / CFCl$_2$, CH$_2$CF$_3$ |
| CF$_2$ClCFCl, Cl / CCH$_2$CH(CH$_3$)$_2$ / CFCl$_2$CFCl | CF$_2$ClCFCl / C=CHCH(CH$_3$)$_2$ / CFCl$_2$CFCl |
| CFCl$_2$(CFCl)$_6$CF$_2$, Cl / CCH$_2$CH$_2$C$_2$F$_5$ / C$_3$F$_4$Cl$_3$ | CFCl$_2$(CFCl)$_6$CF$_2$ / C=CHCH$_2$C$_2$F$_5$ / C$_3$F$_4$Cl$_3$ |
| C$_3$F$_7$, Cl, CH$_2$—CH$_2$ / CCH$_2$CH, CH$_2$ / CF$_2$Cl, CH$_2$—CH$_2$ | C$_3$F$_7$, CH$_2$—CH$_2$ / C=CHCH, CH$_2$ / CF$_2$Cl, CH$_2$—CH$_2$ |

Example 9

When the following chlorides are contacted with a fluorination catalyst that replaces chlorine with fluorine, as in Example 7, olefins as shown are formed.

TABLE VI

| Chloride | Olefin |
|---|---|
| CFCl$_2$CFCl, Cl / CCH$_3$ / CF$_3$CF$_2$ | (CF$_3$CF$_2$)$_2$C=CH$_2$ |
| C$_{10}$F$_9$Cl$_{12}$, Cl / CCH$_2$CH$_3$ / C$_2$F$_4$Cl | C$_{10}$F$_{21}$ / C=CHCH$_3$ / C$_2$F$_5$ |
| C$_3$FCl$_6$, Cl / CCH$_2$CH$_2$CF$_3$ / C$_3$Cl$_7$ | (C$_3$F$_7$)$_2$C=CHCH$_2$CF$_3$ |
| CCl$_2$F, Cl, CH$_2$CH$_3$ / CCH / C$_6$F$_6$Cl$_7$, CH$_2$C$_2$F$_5$ | CF$_3$, CH$_2$CH$_3$ / C=C / C$_6$F$_{13}$, CH$_2$C$_2$F$_5$ |

That which is claimed is:

1. The method which comprises reacting (1) a compound of the formula $$C_nX_{2n+1}(C_{n-1}X_{2n-1}CXCl)\overset{OH}{\underset{|}{C}}CHR_2$$

wherein X is selected from the group consisting of chlorine and fluorine, R is selected from the group consisting of hydrogen, alkyl radicals, cycloalkyl radicals having from 4 to 6 carbon atoms and perfluoroalkylmethyl radicals and $n$ has a value of from 1 to 10 inclusive, with (2) sulfur tetrafluoride whereby there is formed (3) a compound of the formula $$C_nX_{2n+1}(C_{n-1}X_{2n-1}CXF)\overset{Cl}{\underset{|}{C}}CHR_2$$

wherein X, R and $n$ are as above defined.

2. The method which comprises reacting (1) a compound of the formula $$C_nX_{2n+1}(C_{n-1}X_{2n-1}CXCl)\overset{OH}{\underset{|}{C}}CH_3$$

wherein some of the X atoms are chlorine and the remainder are fluorine and $n$ has a value from 1 to 10 inclusive, with (2) sulfur tetrafluoride, whereby there is formed (3) a compound of the formula $$C_nX_{2n+1}(C_{n-1}X_{2n-1}CXF)\overset{Cl}{\underset{|}{C}}CH_3$$

wherein X and $n$ are as above defined.

3. The method which comprises reacting (1) a compound of the formula $$C_nX_{2n+1}(C_{n-1}F_{2n-1}CFCl)\overset{OH}{\underset{|}{C}}CH_3$$

wherein $n$ has a value from 1 to 10 inclusive with (2) sulfur tetrafluoride, whereby there is formed (3) a compound of the formula $$(C_nF_{2n+1})_2\overset{Cl}{\underset{|}{C}}CH_3$$

wherein $n$ is as above defined.

4. The method which comprises reacting (1) a compound of the formula $$(C_nCl_{2n+1})_2\overset{OH}{\underset{|}{C}}CH_3$$

wherein $n$ has a value from 1 to 10 inclusive with (2) sulfur tetrafluoride, whereby there is formed (3) a compound of the formula $$C_nCl_{2n+1}(C_{n-1}Cl_{2n-1}CClF)\overset{Cl}{\underset{|}{C}}CH_3$$

wherein $n$ is as above defined.

5. The method of claim 2 wherein (1) is $$(CCl_3)_2\overset{OH}{\underset{|}{C}}CH_3$$

and (3) is $$CCl_3(CCl_2F)\overset{Cl}{\underset{|}{C}}CH_3$$

6. The method of claim 2 wherein (1) is $$CCl_3(CCl_2F)\overset{OH}{\underset{|}{C}}CH_3$$

and (3) is $$CCl_3(CClF_2)\underset{Cl}{\overset{|}{C}}CH_3$$

7. The method of claim 2 wherein (1) is $$(CCl_2F)_2\underset{OH}{\overset{|}{C}}CH_3$$

and (3) is $$CCl_2F(CClF_2)\underset{Cl}{\overset{|}{C}}CH_3$$

8. The method of claim 2 wherein (1) is $$CClF_2(CCl_2F)\underset{OH}{\overset{|}{C}}CH_3$$

and (3) is $$CCl_2F(CF_3)\underset{Cl}{\overset{|}{C}}CH_3$$

9. The method of claim 2 wherein (1) is $$(CClF_2)_2\underset{OH}{\overset{|}{C}}CH_3$$

and (3) is $$CClF_2(CF_3)\underset{Cl}{\overset{|}{C}}CH_3$$

10. The method which comprises in sequence,
(A) reacting a Grignard reagent of the formula $$R_2CHMgY$$

wherein R is selected from the group consisting of hydrogen atoms, alkyl radicals, cycloalkyl radicals having from 4 to 6 carbon atoms and perfluoroalkyl-methyl radicals, Y is selected from the group chlorine, bromine and iodine with
(1) a ketone of the formula $$C_nX_{2n+1}(C_{n-1}X_{2n-1}CXCl)C=O$$

wherein X is selected from the group consisting of fluorine and chlorine and $n$ has a value from 1 to 10 inclusive to produce upon hydrolysis
(2) a tertiary alcohol of the formula $$C_nX_{2n+1}(C_{n-1}X_{2n-1}CXF)\underset{Cl}{\overset{|}{C}}CHR_2$$

wherein R, X and $n$ as above defined and,
(B) reacting alcohol (2) with (3) sulfur tetrafluoride, whereby there is obtained (4) a compound of the formula $$C_nX_{2n+1}(C_{n-1}X_{2n-1}CXCl)\underset{OH}{\overset{|}{C}}CHR_2$$

wherein R, X and $n$ are as above defined.
11. The method which comprises, in sequence,
(A) reacting methyl Grignard reagent with
(1) an acetone of the formula $CX_2Cl(CX_3)C=O$ wherein X is selected from the group consisting of fluorine and chlorine, to produce upon hydrolysis,
(2) a tertiary alcohol of the formula $$CX_2Cl(CX_3)\underset{OH}{\overset{|}{C}}CH_3$$

wherein X is as above defined, and
(B) reacting alcohol (2) with
(3) sulfur tetrafluoride, whereby there is obtained
(4) a compound of the formula $$CX_2F(CX_3)\underset{Cl}{\overset{|}{C}}CH_3$$

wherein X is as above defined.
12. The method which comprises, in sequence,
(A) reacting methyl Grignard reagent with
(1) an acetone of the formula $CF_2Cl(CF_3)C=O$, to produce upon hydrolysis
(2) a tertiary alcohol of the formula $$CF_2Cl(CF_3)\underset{OH}{\overset{|}{C}}CH_3$$

(B) reacting alcohol (2) with
(3) sulfur tetrafluoride, whereby there is obtained
(4) a compound of the formula $$(CF_3)_2\underset{Cl}{\overset{|}{C}}CH_3$$

and
(C) dehydrochlorinating compound (4) with an alkali metal hydroxide or quinoline to produce
(5) the isobutene of the formula $(CF_3)_2C=CH_2$.
13. The method which comprises, in sequence,
(A) reacting methyl Grignard reagent with
(1) an acetone of the formula $(CCl_3)_2C=O$, to produce upon hydrolysis $$(CCl_3)_2\underset{OH}{\overset{|}{C}}CH_3$$

(2) a teritary alcohol of the formula
(B) reacting alcohol (2) with
(3) sulfur tetrafluoride, whereby there is obtained
(4) a compound of the formula $$CCl_3(CCl_2F)\underset{Cl}{\overset{|}{C}}CH_3$$

References Cited

UNITED STATES PATENTS

| | | | |
|---|---|---|---|
| 2,824,897 | 2/1958 | Wujciak | 260—633 |
| 2,862,977 | 12/1958 | Schreyer | 260—633 |
| 2,875,253 | 2/1959 | Barnhart | 260—653 |
| 2,880,247 | 3/1959 | Miller | 260—653 |
| 3,189,656 | 6/1965 | Gordon et al. | 260—633 |

FOREIGN PATENTS 510,970  10/1952  Belgium.

OTHER REFERENCES

Knunyants et al.: Izvestia Akad. Nauk SSSR, 1960, No. 4, 686–692.

LEON ZITVER, *Primary Examiner.*

DANIEL D. HORWITZ, *Examiner.*

M. B. ROBERTO, *Assistant Examiner.*